(12) United States Patent
Hughes et al.

(10) Patent No.: US 10,728,289 B2
(45) Date of Patent: Jul. 28, 2020

(54) VARIED WI-FI SERVICE LEVELS

(71) Applicant: Facebook, Inc., Menlo Park, CA (US)

(72) Inventors: Charles J. Hughes, Palo Alto, CA (US); Michael John McKenzie Toksvig, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 9 days.

(21) Appl. No.: 14/092,695

(22) Filed: Nov. 27, 2013

(65) Prior Publication Data

US 2015/0149649 A1  May 28, 2015

(51) Int. Cl.
*H04L 29/06* (2006.01)
*H04L 29/08* (2006.01)

(52) U.S. Cl.
CPC .......... *H04L 65/1069* (2013.01); *H04L 65/80* (2013.01); *H04L 67/12* (2013.01)

(58) Field of Classification Search
CPC .................... H04L 65/80; H04L 65/1069
See application file for complete search history.

(56) References Cited

U.S. PATENT DOCUMENTS

| | | | |
|---|---|---|---|
| 7,340,522 B1* | 3/2008 | Basu ............... | G06F 9/5033 709/217 |
| 8,782,741 B1* | 7/2014 | L'Heureux et al. ........... | 726/3 |
| 8,943,202 B2* | 1/2015 | Chevillat ............... | 709/225 |
| 2005/0060553 A1* | 3/2005 | Allen ............... | H04L 63/0428 713/182 |
| 2007/0255841 A1* | 11/2007 | Chong ............... | H04L 63/0807 709/229 |
| 2012/0192258 A1* | 7/2012 | Spencer et al. ............... | 726/7 |
| 2013/0318180 A1* | 11/2013 | Amin ............... | H04L 65/403 709/206 |
| 2015/0113024 A1* | 4/2015 | Howe ............... | 707/798 |

* cited by examiner

*Primary Examiner* — Philip J Chea
*Assistant Examiner* — Robert B McAdams
(74) *Attorney, Agent, or Firm* — Artegis Law Group, LLP (57) ABSTRACT

In one embodiment, a method includes receiving a request from a client computing device of a user to access a communication network; and identifying a particular tier for the client computing device from among a number of tiers of service based at least in part on social-graph information of the user. Each tier of service includes one or more session settings of the communication network. The method also includes configuring a session of the communication network for the client computing device based at least in part on one or more of the session settings of the identified tier of service; and establishing the configured session between the client computing device and the communication network.

20 Claims, 6 Drawing Sheets

VARIED WI-FI SERVICE LEVELS

TECHNICAL FIELD

This disclosure generally relates to communication networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a service may include multiple tiers of features or service based on the behavior of the user. The tiers may be applied to any service or resource that requires determination of a user access level. Examples include a communication network (e.g. WI-FI), a shared computing resource (e.g. public computing device at an Internet cafe), or any shared resource with access control (e.g. an automobile, front door of a home, or a gym). In particular embodiments, a WI-FI network may provide different levels of service based on current behavior or social-graph information of the user. As an example, a user connecting to the Internet through a WI-FI network of a particular establishment may receive additional access time for checking-in (e.g. 3 hour), even more time for liking a page associated with the establishment (e.g. 8 hours), or a default time without logging on to the network (e.g. 1 hour). As another example, the bandwidth, quality of service (QoS), or amount of traffic available to user's that log on to the network may be higher than those who don't.

In particular embodiments, a service may include multiple tiers of features or service based on the social graph information of the user. As an example, a WI-FI network may be administered through a social-networking system. Furthermore, if the user obtains access to the WI-FI network by logging on to the social-networking system, the previous behavior of the user on the WI-FI network may be used to determine the level of service to provide the user (e.g. loyalty program). As another example, for a personal WI-FI network, a "friend" of the user owning the network may be provided automatic access to the WI-FI network or a higher level of service than someone not connected to the user. Example signals that may be used to determine the level of service provided to each user are: connection to the user through a social edge, previous check-ins at the geo-location associated with the WI-FI network, or previous behavior of the user. In particular embodiments, the level of service may be determined through calculation of a score that may be a composite of one or more factors such as for example, past behavior of the user with regard to the entity that owns the Wi-Fi network and current behavior such as liking a page associated with the entity.

In particular embodiments, a randomly generated session token that uniquely identifies the user accessing a network to the administrator without providing the specific MAC address of the routers being used for access. As an example, a randomly generated token may identify the user accessing a WI-FI network without providing the MAC or IP address accessing the network to the social-networking system or providing the social-networking system user ID to the owner of the WI-FI network. In particular embodiments, if the user accessing the WI-FI network is logged on to the social-networking system, the social-networking system may map the session token to the user ID of the user. On the other hand, the owner of the WI-FI network can uniquely map the user to a particular session on the WI-FI network through the session token. In particular embodiments, a level of service described above may be determined for the user based on the social-graph information of the user identified through the unique user ID.

DESCRIPTION OF EXAMPLE EMBODIMENTS

Figure 1:
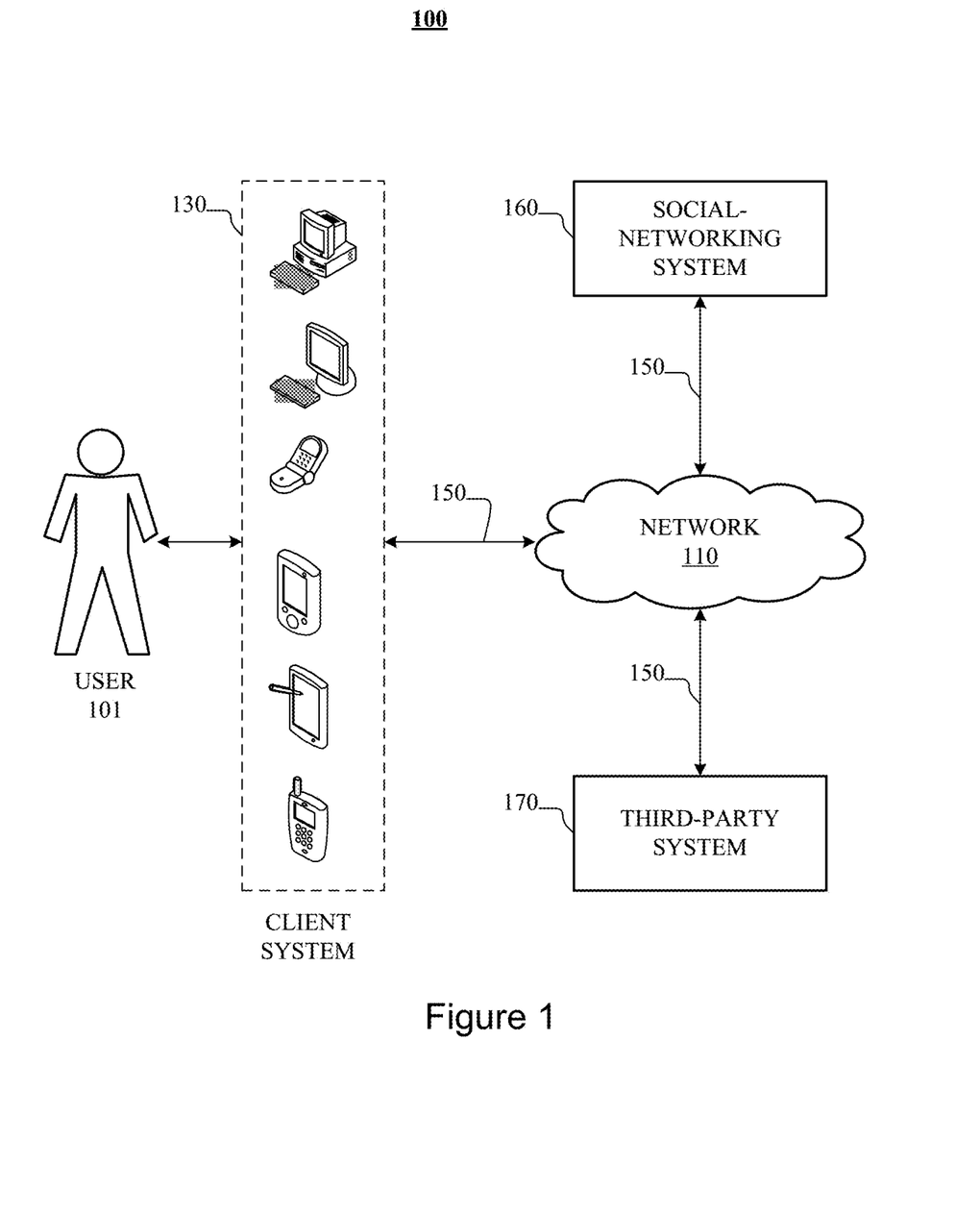
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global positioning system (GPS) device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable user 101 to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as a server of social-networking system 160 or a server associated with a third-party system 170), and the web browser 132 may generate a HTTP request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to user 101. As described above, the webpage may be a network-access page associated with a captive portal. This disclosure contemplates any suitable webpage files. As an example and not by way of limitation, webpages may render from HTML files, Extensible HTML (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may include one or more network resources, such as for example servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server.

In particular embodiments, a service administered by social-networking system 160, third-party system 170, or any combination thereof, may have multiple tiers of features or service, where the tiers for each user 101 may be determined based at least in part on the current or past behavior of each user 101. As an example and not by way of limitation, a service or resource that implements a determination of a user access level (e.g. access to communication network 110, a shared client system 130, or any suitable shared resource with access control (e.g. a control access door or gym) may be segmented to have different tiers of service. As described below, a WI-FI communication network 110 may provide different tiers of service based at least in part on current behavior of social-graph information of user 101.

Figure 2:
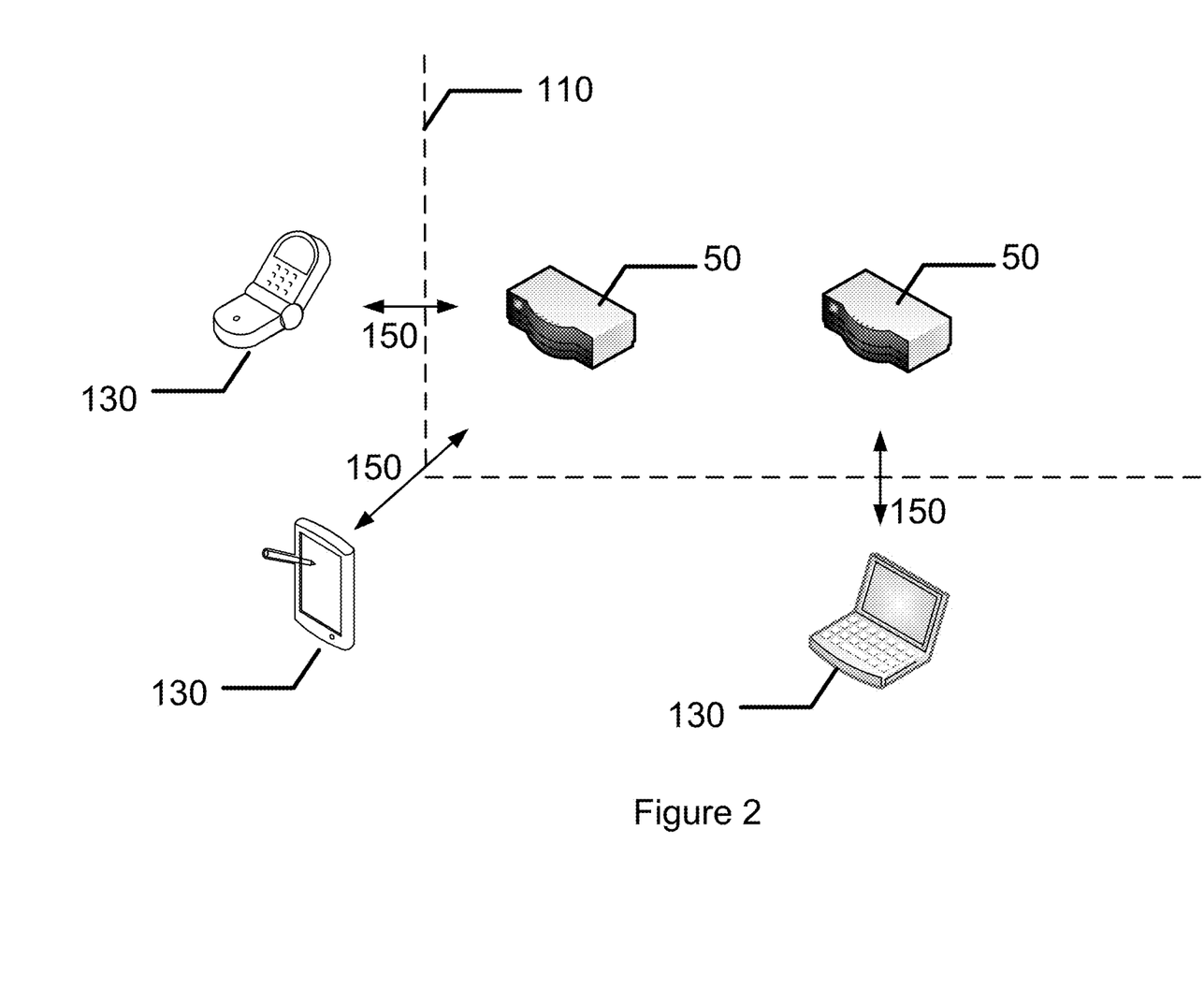
FIG. 2 illustrates an example portion of an example communication network.

FIG. 2 illustrates an example portion of an example communication network. In particular embodiments, a communication network 110 administered by a computer system may include one or more routers 50. Although FIG. 2 describes and illustrates a particular communication network with a particular arrangement of client systems and routers, this disclosure contemplates any suitable communication network with any suitable arrangement of routers and client systems. As an example and not by way of limitation, the computer system administering communication network 110 may be a computing infrastructure and platform that may include one or more components for computing, storage, networking, or any combination thereof. In particular embodiments, the computer system administering communication network 110 may be unaffiliated with the particular entity that owns communication network 110. As an example and not by way of limitation, communication network 110 may be a LAN, such as for example a WI-FI network, and routers 50 of communication network 110 may be located at a geolocation associated with the particular entity, such as for example a business.

Access to a WAN, such as for example the Internet, may be provided to one or more client systems 130 through communication network 110 through a session established between client systems 130 and communication network 110. As an example and not by way of limitation, one or more client systems 130 may access the Internet through routers 50 of communication network 110 of the particular entity, such as for example an airport authority, that is administered, such as for example by BOINGO. As another example, the particular entity may correspond to a particular domain of the Internet, such as for example a second-level domain (SLED). An example SLED may correspond to a social-networking system (e.g. www.FACEBOOK.com). A session between client device 130 and communication network 110 may be established in response to a user performing a login procedure when connecting to communication network 110 through client system 130. As an example and not by way of limitation, the login procedure may include obtaining a login code, providing an e-mail address associated with the user, performing a "check in" at a geolocation associated with the particular entity, or any combination thereof, through a network-access page described above. In particular embodiments, the user agent of client system 130 may be directed to a network resource (e.g. server) of the computer system, such as for example a social-networking system, in response to connecting to communication network 110 through client system 130. As an example and not by way of limitation, a user agent may be a software client that may operate on behalf of the user, such as for example, a web browser or e-mail client.

As described above, access to communication network 110 may be segmented into different tiers of service and a particular tier identified for a user based at least in part on the current activity of the user. In particular embodiments, each tier of service may include one or more session settings that may define at least in part one or more characteristics of the session. As an example and not by way of limitation, sessions of communication network 110 may be configured on the basis of bandwidth, quality of service (QoS), an amount of traffic or data available to the user, or any combination thereof. For example, the user of client system 130 who is a member of a loyalty program of the entity owning communication network 110 may be provided a session that is configured in accordance to a particular tier of service that has higher bandwidth than a nominal bandwidth. As another example, a user may be provided a session that is characterized by a nominal amount (e.g. 1 hour) of access time in response to performing the login procedure or a session characterized by an additional amount (e.g. 3 hours) of access time by "checking in" at a geolocation of an entity (e.g. a business). Furthermore, a higher tier of service may provide the user a session on communication network 110 with a higher amount (e.g. 8 hours) of access time in response to the user "liking" a page associated with the entity owning communication network 110. As another example, tiers of service may be partitioned on a content-filtering basis. For example, a default tier of service may provide the user access to a light-weight version of the webpage of a specific domain (e.g. FACEBOOK ZERO), a second tier of service may provide the user access to the webpage of the specific domain (e.g. FACEBOOK), a third tier of service may provide the user limited access to the entire Internet with the capability of viewing low resolution photos and without the capability of streaming video, and highest tier of service that provides unlimited access to the Internet.

In particular embodiments, users accessing communication network 110 may be assigned a particular tier of service based at least in part on social-graph information of the user. As described above, a user of client system 130 may be provided a session on communication network 110 by logging on to the social-networking system. Furthermore, the social-networking system may access a social-graph of the user in response to the user of client system 130 logging on to the social-networking system and identify a particular tier of service for the user based at least in part on the social-graph information. As an example and not by way of limitation, social-graph information may include one or more connections to a user through at least one social-graph edge, previous "check-ins" at the geolocation associated with communication network 110, previously "liking" the webpage of the entity, or any other suitable action corresponding to edges of the social-graph. For example, the social-networking system may determine the user is a member of a loyalty program or has previously "liked" the webpage of the entity that owns the communication network 110 and assign the user to a higher tier of service. As another example, a user that is a "friend" of the owner of a personal communication (e.g. a personal WI-FI) network 110 or mobile hotspot may be assigned a tier of service that allows automatic access to communication network 110 or mobile hotspot, or a higher tier of service than a user that is unconnected to the owner. In particular embodiments, identification of a particular tier appropriate for each user may be based at least in part on calculating a score that may be a composite of one or more signals from the social-graph of the user. As described above, example signals of a composite score may include past behavior of the user with regard to the entity that owns communication network 110 that may be combined with current behavior of the user, such as for example "liking" the webpage of the entity. As described above, a session may be established between client system 130 and communication network 110 that is configured based at least in part on one or more session settings of the identified tier of service.

In particular embodiments, routers 50 of communication network 110 may generate a random session token that may uniquely identifies the session of the user on communication network 110 without providing the media access control (MAC) or internet protocol (IP) address of the particular routers 50 of communication network 110 to the administrator system (e.g. social-networking system). Furthermore, the random session token may be used by a social-networking system to associate the session of communication network 110 to a unique user identification (user ID) of a user account of the social-networking system without identifying the MAC or IP address of the router 50 of communication network 110. In other words, the random session token may shield the userID of the user from the entity that owns communication network 110 and the geolocation of the user from the administrator of communication network, unless the user specifically performs a "check in" at the geolocation through the social-networking system. In particular embodiments, a particular tier of service may be identified to the user based at least in part on the social-graph information of the user that is identified to the social-networking system through association of the random session token to the userID of the user account on the social-networking system. As described above, the session between client system 130 and communication network 110 may be configured based at least in part on the session settings of the tier identified for the user.

Figure 3:
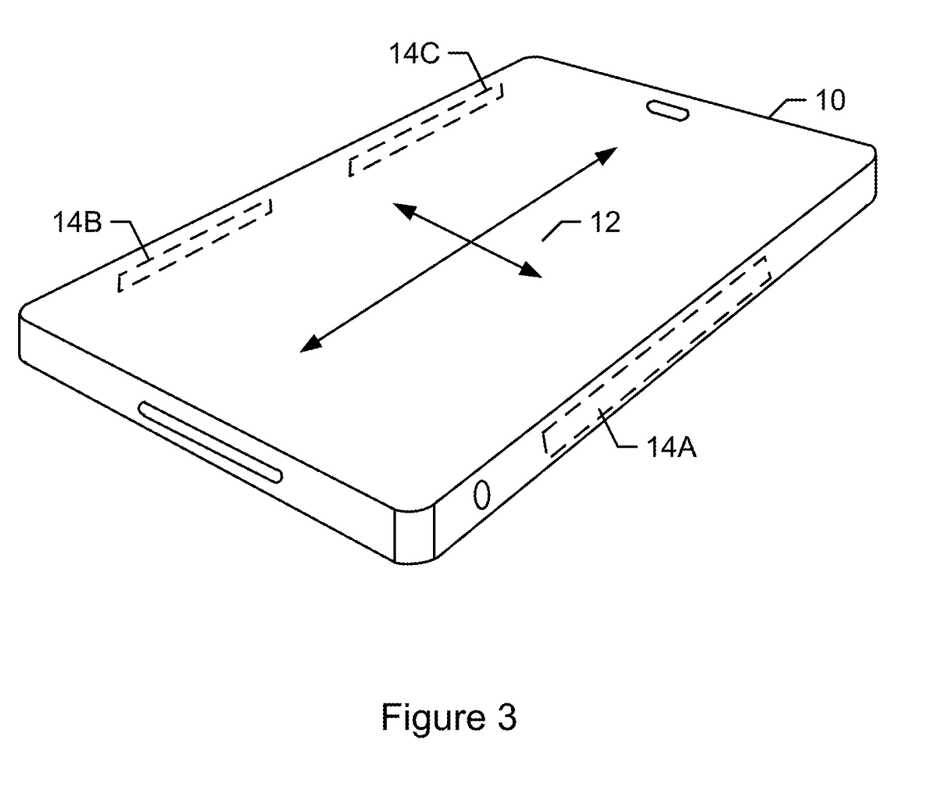
FIG. 3 illustrates an example mobile computing device.

FIG. 3 illustrates an example mobile computing device. In particular embodiments, a client system, described above, may be a mobile computing device 10. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or any suitable combination of two or more of these. In particular embodiments, mobile computing device 10 may have a touch sensor 12 as an input component. In the example of FIG. 3, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable communication network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

As an example and not by way of limitation, mobile computing device 10 may connect to a communication network (e.g. WI-FI network) by executing the processes of a configuration pipeline of the operating system (OS) of mobile computing device 10. In particular embodiments, the configuration pipeline may support processes for configuring the wireless connection. In particular embodiments, mobile computing device 10 may utilize a user agent, such as for example a web browser or native application, executed on mobile computing device 10 to access a communication network, such as for example a WI-FI network. As described above, the user agent of mobile computing device 10 may be assigned a random session token identifying a particular session of the communication network.

As described above, mobile computing device 10 may connect to a particular domain, such as for example a SLED (e.g. www.FACEBOOK.com), associated with the communication network through the user agent, such as for example an application, executed on mobile computing device 10. As an example and not by way of limitation, the user of mobile computing device 10 may access the communication network by logging on to the particular domain associated with the communication network. In particular embodiments, an application executed on mobile computing device 10 may be configured to facilitate interaction between the particular domain of the communication network, such as for example a SLED. As described above, the user of mobile computing device 10 may be assigned a particular tier of service associated with the communication network based at least in part on the association of the random session token to an account of the user on the particular domain. In particular embodiments, a network resource of the particular domain may determine mobile computing device 10 is located at a particular geolocation based at least in part on the IP address of the router providing access for mobile computing device 10 to the communication network. As an example and not by way of limitation, the user may manually "check in" on the social-networking system at a geolocation associated with the communication network through the user agent (e.g. native application).

As described above, a particular tier of service may identified for the user of mobile computing device 10 based at least in part on the social-graph information or current behavior of the user. In particular embodiments, identification of the particular tier of service may be based on calculating an affinity coefficient, described below, of the user with respect to entity providing the service. Furthermore, the identification of a particular tier of service associated with the communication network may be based at least in part on the user "check-in" at the geolocation of the communication network through mobile computing device 10. As described above, any suitable service that uses a determined access level may segmented into multiple tiers. As an example and not by way of limitation, the user may access particular areas of a geolocation that requires verification of an access level, such as for example a hospitality suite or gym of a hotel, based on the user of mobile computing device 10 "liking" the hotel. As another example, the user may access an automobile or house of another user with access control based at least in part on the information of the user. For example, a distance the user is able to drive an automobile of another user may be based at least in part on calculating the affinity coefficient between the user and the other user. Furthermore, each tier of service may have a respective affinity coefficient threshold value and identification of a particular tier of service may be based at least in part on a comparison of the value of the calculated affinity coefficient of the user. In particular embodiments, a session between mobile computing device 10 and the communication network may be configured based on the session settings of the identified tier.

Figure 4:
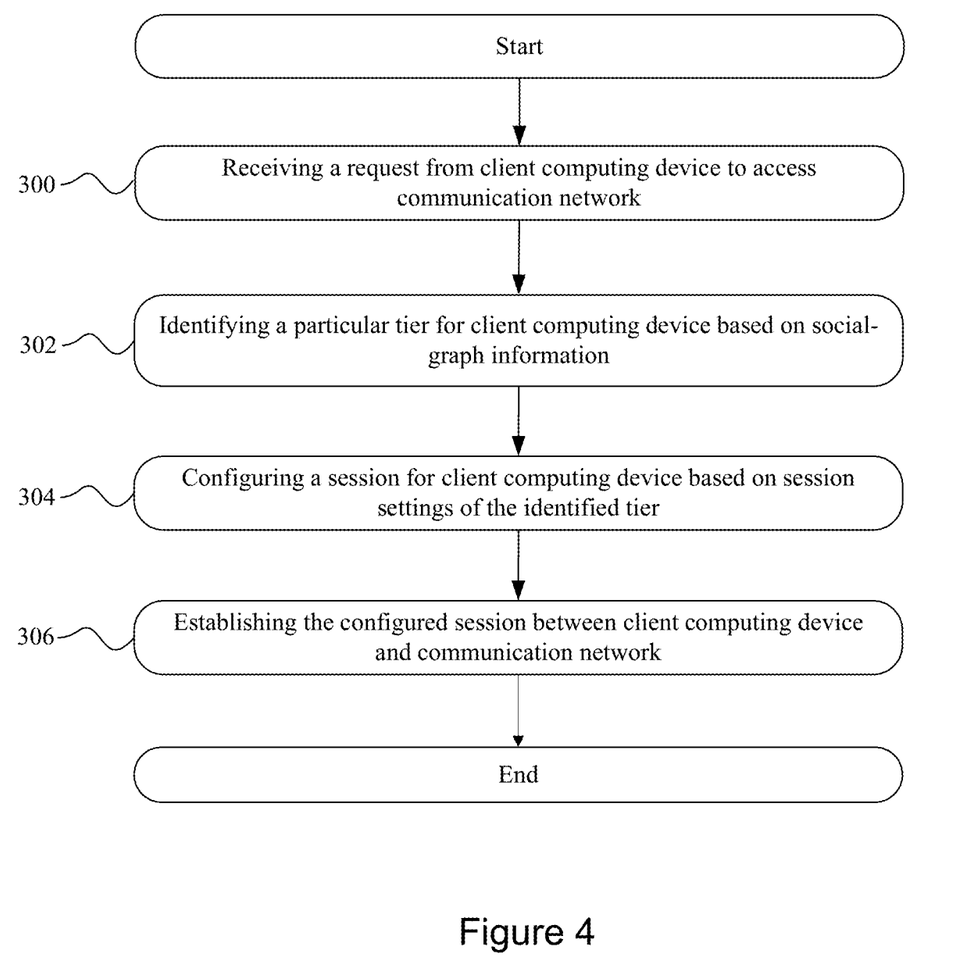
FIG. 4 illustrates an example method for providing a configured session to a client device.

FIG. 4 illustrates an example method for providing a configured session to a client device. The method may start at step 300, where a computing device receives a request from a client computing device of a user to access a communication network. In particular embodiments, the computing device may be a server of a social-networking system. Furthermore, the social-networking system may be the administrator of the communication network. Step 302 identifies, by the computing device, a particular tier for the client computing device from among a number of tiers of service based at least in part on social-graph information of the user. In particular embodiments, each tier of service may include one or more session settings of the communication network. As an example and not by way of limitation, one or more session settings may be related to an amount of access time or bandwidth for a session. At step 304, the computing device configures a session of the communication network for the client computing device based at least in part on one or more of the session settings of the identified tier of service. At step 306, the computing device establishes the configured session between the client computing device and the communication network, at which point the method may end. Although this disclosure describes and illustrates particular steps of the method of FIG. 4 as occurring in a particular order, this disclosure contemplates any suitable steps of the method of FIG. 4 occurring in any suitable order. Particular embodiments may repeat one or more steps of the method of FIG. 4, where appropriate. Moreover, although this disclosure describes and illustrates an example method for providing a configured session to a client device including the particular steps of the method of FIG. 4, this disclosure contemplates any suitable method for providing a configured session to a client device including any suitable steps, which may include all, some, or none of the steps of the method of FIG. 4, where appropriate. Furthermore, although this disclosure describes and illustrates particular components carrying out particular steps of the method of FIG. 4, this disclosure contemplates any suitable combination of any suitable components devices, or systems carrying out any suitable steps of the method of FIG. 4.

Figure 5:
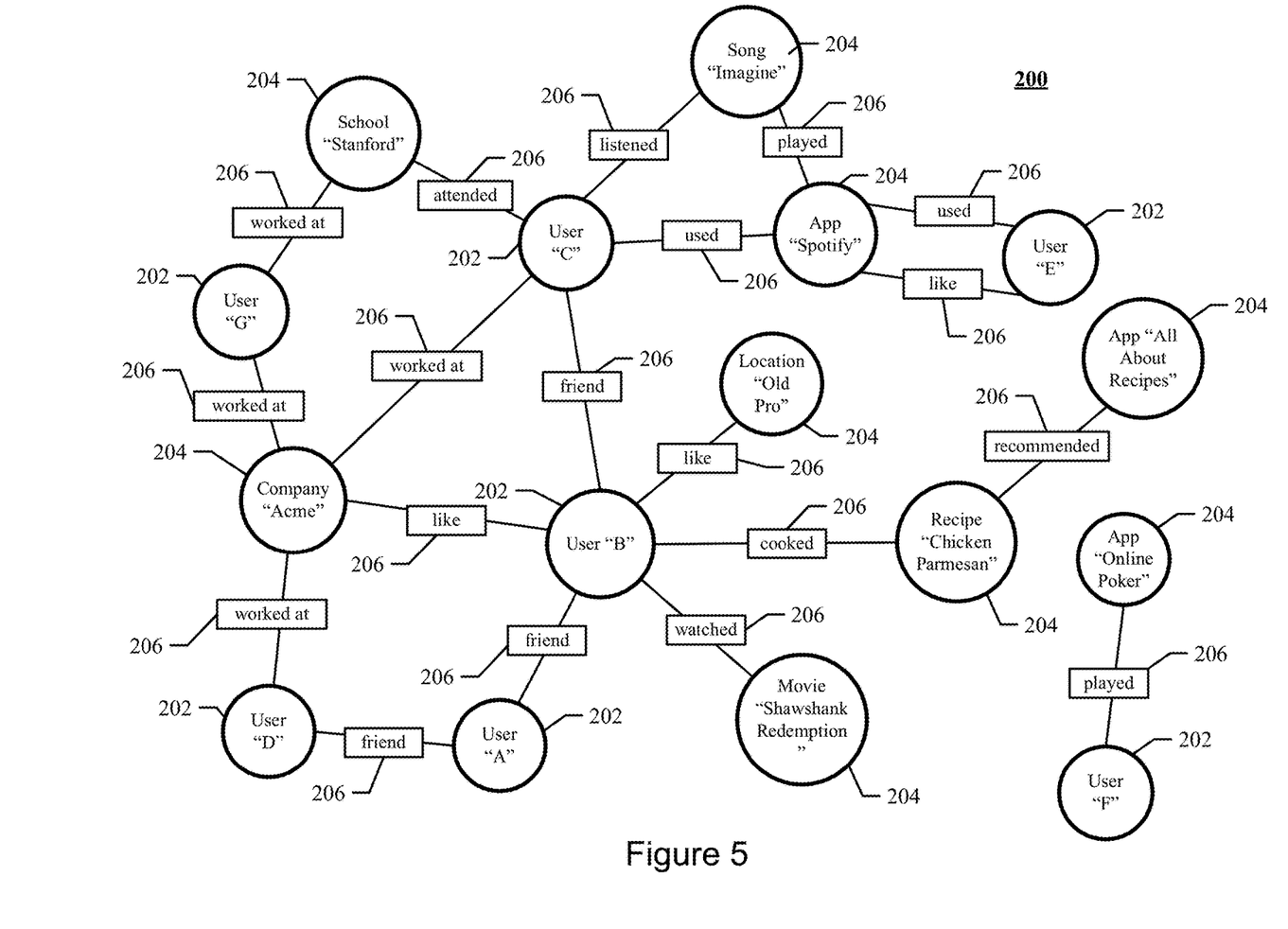
FIG. 5 illustrates an example social graph.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. As described above, users associated with user nodes 202 may be classified into particular categories based at least in part on information associated with user nodes 202. As an example and not by way of limitation, users may be categorized based at least in part on age, location, number of friends, or any combination thereof. Furthermore, the users may be classified based on information associated with user nodes 202 in conjunction with other information associated with the users stored in an action log, as described above, such as for example recent actions performed by users on social-networking system 160.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As described above, a particular tier of service may identified for a user based at least in part on the information of social graph 200. In particular embodiments, the service may be a public communication network associated with a particular concept node 204 that corresponds to a particular business. As an example and not by way of limitation, a particular concept node 204 of social graph 200 may correspond to a business that owns the communication network and a particular user node 202 may correspond to the user. Furthermore, the particular user node 202 may be connected to at least one of concept nodes 204 corresponding to the entity by one or more edges 206. As an example and not by way of limitation, one or more of the edges connecting the particular user node 202 corresponding to the user to the particular concept node 206 of the business may correspond to a "check-in" at a geolocation of the communication network or "liking" a page of an entity associated with the communication network, as described above.

As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 6:
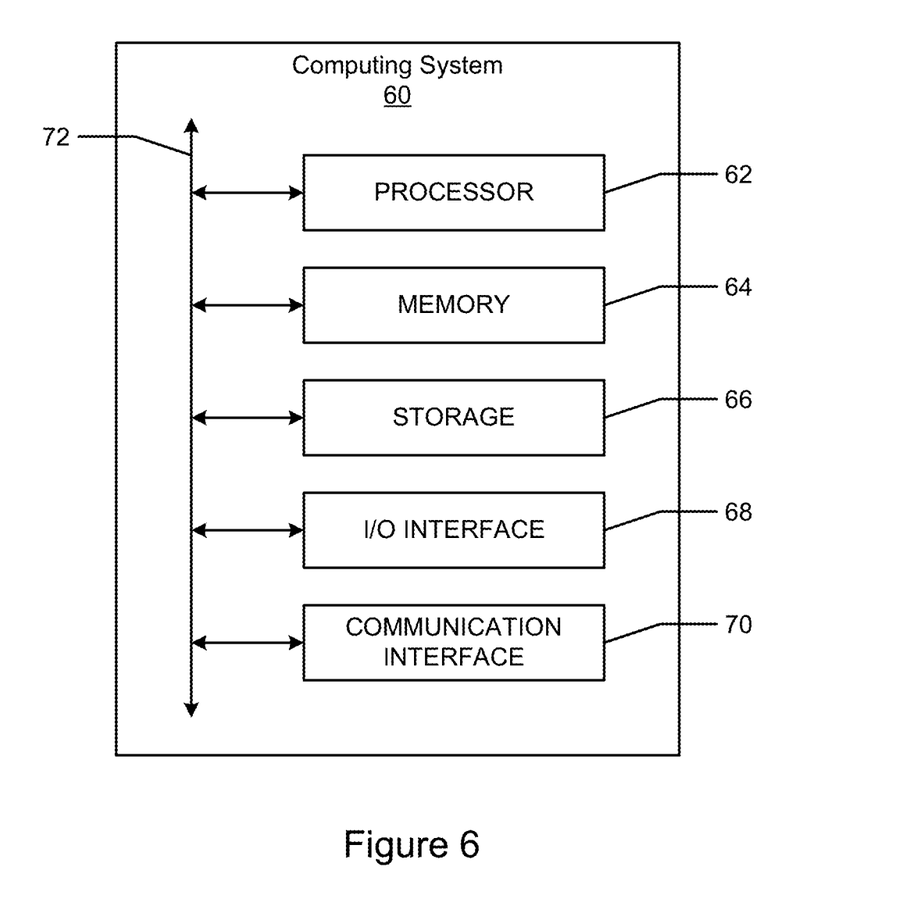
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile computing system 10, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving an indication that a user has established a check-in within an online social networking system, wherein the check-in causes the online social networking system to create an edge between a concept node of a social graph and a user node of the social graph, wherein the concept node identifies an entity that operates a communication network in a given geographic location, and wherein the check-in indicates that the user is located at the given geographic location irrespective of whether a physical location of the user matches the geographic location;
by the computing device and responsive to the check-in, calculating an affinity score between the user and the entity that operates the communication network, wherein the affinity score is calculated based on the check-in and at least one interaction between the user and an online profile page of the entity within the online social networking system;
by the computing device, assigning a first tier of service from a plurality tiers of services associated with the communication network to a client computing device upon determining that the affinity score satisfies a first affinity threshold value associated with the first tier of service;
by the computing device, configuring a session of the communication network for the client computing device based at least in part on the assigned tier of service, wherein the configuring the session of the communication network for the client computing device comprises associating a session token to the assigned tier of service; and
by the computing device, establishing the configured session between the client computing device and the communication network.

2. The method of claim 1, wherein the configured session comprises one or more session settings, and wherein the one or more of the session settings comprise an amount of access time, bandwidth, quality of service (QoS), amount of data, or any combination thereof.

3. The method of claim 1,
wherein the social graph comprises:
a plurality of nodes; and
edges connecting the nodes, each edge comprising at least one edge-type, each edge-type corresponding to a particular action the user has performed with respect to an entity on the communication network.

4. The method of claim 1, further comprising assigning a second tier of service to the client computing device upon determining that the affinity score satisfies a second affinity threshold value, wherein the second affinity threshold value is higher than the first affinity threshold value, and wherein the second tier of service differs from the first tier of service in at least one aspect.

5. The method of claim 1, wherein the computing device is a server of a social-networking system administering the communication network.

6. The method of claim 5, further comprising associating the user with an account on the social-networking system based on the user logging on to the social-networking system.

7. The method of claim 6, further comprising associating the account on the social-networking system with a particular session of the communication network.

8. The method of claim 3, wherein each edge-type is selected from a group of edge-types comprising viewing a particular web page, selecting a particular link or advertisement, liking a page associated with the entity, checking-in with the entity, sharing the entity, following the entity, or posting content related to the entity.

9. One or more computer-readable non-transitory storage media embodying software configured when executed to:
receive an indication that a user has established a check-in within an online social networking system, wherein the check-in causes the online social networking system to create an edge between a concept node of a social graph and a user node of the social graph, wherein the concept node identifies an entity that operates a communication network in a given geographic location, and wherein the check-in indicates that the user is located at the given geographic location irrespective of whether a physical location of the user matches the geographic location;

responsive to the check-in, calculate an affinity score between the user and the entity that operates the communication network, wherein the affinity score is calculated based on the check-in and at least one interaction between the user and an online profile page of the entity within the online social networking system;

assign a first tier of service from a plurality tiers of services associated with the communication network to a client computing device upon determining that the affinity score satisfies a first affinity threshold value associated with the first tier of service;

configure a session of the communication network for the client computing device based at least in part on the assigned tier of service, wherein the configuring the session of the communication network for the client computing device comprises associating a session token to the assigned tier of service; and establish the configured session between the client computing device and the communication network.

10. The media of claim 9, wherein the configured session comprises one or more session settings, and wherein one or more of the session settings comprise an amount of access time, bandwidth, quality of service (QoS), amount of data, or any combination thereof.

11. The media of claim 9,
wherein the social graph comprises:
a plurality of nodes; and
edges connecting the nodes, each edge comprising at least one edge-type, each edge-type corresponding to a particular action the user has performed with respect to an entity on the communication network.

12. The media of claim 9, wherein the software is further configured to assign a second tier of service to the client computing device upon determining that the affinity score satisfies a second affinity threshold value, wherein the second affinity threshold value is higher than the first affinity threshold value, and wherein the second tier of service differs from the first tier of service in at least one aspect.

13. The media of claim 9, wherein the computing device is a server of a social-networking system administering the communication network.

14. The media of claim 13, wherein the software is further configured to associate the user with an account on the social-networking system based on the user logging on to the social-networking system.

15. The media of claim 14, wherein the software is further configured to associate the account on the social-networking system with a particular session of the communication network.

16. The media of claim 11, wherein each edge-type is selected from a group of edge-types comprising viewing a particular web page, selecting a particular link or advertisement, liking a page associated with the entity, checking-in with the entity, sharing the entity, following the entity, or posting content related to the entity.

17. A device comprising:
a processor; and
one or more computer-readable non-transitory storage media coupled to the processor and embodying software that:
receive an indication that a user has established a check-in within an online social networking system, wherein the check-in causes the online social networking system to create an edge between a concept node of a social graph and a user node of the social graph, wherein the concept node identifies an entity that operates a communication network in a given geographic location, and wherein the check-in indicates that the user is located at the given geographic location irrespective of whether a physical location of the user matches the geographic location, responsive to the check-in, calculate an affinity score between the user and the entity that operates the communication network, wherein the affinity score is calculated based on the check-in and at least one interaction between the user and an online profile page of the entity within the online social networking system;

assign a first tier of service from a plurality tiers of services associated with the communication network to a client computing device upon determining that the affinity score satisfies a first affinity threshold value associated with the first tier of service;

configure a session of the communication network for the client computing device based at least in part on the assigned tier of service, wherein the configuring the session of the communication network for the client computing device comprises associating a session token to the assigned tier of service; and establish the configured session between the client computing device and the communication network.

18. The device of claim 17, wherein the configured session comprises one or more session settings, and wherein one or more of the session settings comprise an amount of access time, bandwidth, quality of service (QoS), amount of data, or any combination thereof.

19. The device of claim 17,
the social graph comprises:
a plurality of nodes; and
edges connecting the nodes, each edge comprising at least one edge-type, each edge-type corresponding to a particular action the user has performed with respect to an entity on the communication network.

20. The device of claim 17, wherein the software is further configured to assign a second tier of service to the client computing device upon determining that the affinity score satisfies a second affinity threshold value, wherein the second affinity threshold value is higher than the first affinity threshold value, and wherein the second tier of service differs from the first tier of service in at least one aspect.

* * * * *